(12) United States Patent  
Harvey

(10) Patent No.: US 8,757,949 B2  
(45) Date of Patent: Jun. 24, 2014

(54) SELF COUNTER-SINKING FASTENER

(76) Inventor: Craig Stanley Harvey, Salamander Bay (AU)

( * ) Notice: Subject to any disclaimer, the term of this patent is extended or adjusted under 35 U.S.C. 154(b) by 0 days.

(21) Appl. No.: 13/498,823

(22) PCT Filed: Sep. 29, 2010

(86) PCT No.: PCT/AU2010/001271  
§ 371 (c)(1),  
(2), (4) Date: Mar. 28, 2012

(87) PCT Pub. No.: WO2011/038447  
PCT Pub. Date: Apr. 7, 2011

(65) Prior Publication Data  
US 2012/0183373 A1    Jul. 19, 2012

(30) Foreign Application Priority Data  
Sep. 30, 2009 (AU) ................................ 2009230753

(51) Int. Cl.  
*F16B 35/06* (2006.01)

(52) U.S. Cl.  
USPC ........................................ 411/399; 411/405

(58) Field of Classification Search  
USPC ............... 411/399, 402, 403, 405, 408  
See application file for complete search history.

(56) References Cited

U.S. PATENT DOCUMENTS

| 246,368 | A | * | 8/1881 | Campbell | 411/399 |
| 378,614 | A | * | 2/1888 | Palmer | 411/399 |
| 388,000 | A | * | 8/1888 | Rider | 411/399 |
| 610,423 | A | * | 9/1898 | Van Ommeren | 411/405 |
| 679,970 | A | * | 8/1901 | Keeler | 411/405 |
| 1,238,636 | A | * | 8/1917 | Christofferson | 411/399 |
| 5,762,457 | A | * | 6/1998 | Lide | 411/405 |
| 5,772,376 | A | * | 6/1998 | Konig | 411/399 |
| 6,334,748 | B1 | * | 1/2002 | Gudjonsson | 411/399 |
| 6,402,757 | B1 | * | 6/2002 | Moore et al. | 606/80 |

FOREIGN PATENT DOCUMENTS

| DE | 3143120 A1 | 5/1983 |
| DE | 29903686 U1 | 7/2000 |
| FR | 2562180 A1 | 10/1985 |
| GB | 2210428 A | 6/1989 |
| GB | 2382854 A | 6/2003 |

* cited by examiner

*Primary Examiner* — Roberta Delisle  
(74) *Attorney, Agent, or Firm* — Novak Druce Connolly Bove + Quigg LLP

(57) ABSTRACT

A self-countersinking fastener for engagement with wood or similar composite material, said fastener including a penetrating shaft, and a tool engaging head; wherein said tool engaging head is substantially frusto-conical in overall shape and provided with one or more indent regions into which said material may be pushed as the head is turned; wherein each of said indent regions include: a trench extending substantially vertically through the entirety of said head; and a tailing section extending through the entire height of the head and extending forward in the direction of turning from said trench such that the radius of the head in the corresponding section increases throughout said section.

15 Claims, 3 Drawing Sheets

SELF COUNTER-SINKING FASTENER

FIELD OF THE INVENTION

The invention relates to the field of design and manufacture of hardware fasteners, including screws for wood and composite materials. In particular, the invention relates to fasteners adapted to be self-countersinking when used in wood or wood-like composite materials.

BACKGROUND OF THE INVENTION

In the field of fastening devices, particularly those used for fastening wood or wood-like composite materials, there is regularly a requirement for screw-in fasteners to be self-countersinking. That is, it is required that, by no more than the act of screwing the fastener into position, the fastener's structure facilitates the ability of the head of the fastener to 'sink' below the surface of the material such that the head finishes flush (or lower) with respect to the surface of the material.

Traditionally, a countersunk fastener head is achieved by preparing the surface of the material by removing sufficient volume of the material in a frusto-conical shape to accommodate the fastener head. This is usually done with a countersunk head attached to a drill or bore.

However, the self-countersunk fastener must be designed to obviate this preparation step. This requires that the displacement and/or compression of sufficient of the material to accommodate the volume of the fastener head must be achieved by the rotation of the fastener alone. If the head design does not perform this function effectively, a 'mushrooming' effect can occur where the There are some self-countersinking fastener heads known in the prior art. U.S. Reissue Pat. No. 36,741 by Walther et al and U.S. Pat. No. 3,903,784 by the Anchor Bolt & Screw Company both disclose self-countersinking screws that feature a series of scallops arranged around a frusto-conical head that, in profile, form a series of cutting edges that engage with the wood or wood-like material to carve out a niche, while the 'carved' material is compressed into the scallops.

However, these designs are limited in that the combined volume of the scallops do not equal the volume of wood material required to be displaced to accommodate the entire head, leading to 'mushrooming' of the material, which is not desired.

Accordingly, it is an object of the present invention to provide a self-countersinking fastener that substantially alleviates the known shortcomings of the prior art.

SUMMARY OF THE INVENTION

According to one aspect of the invention, there is provided a self-countersinking fastener for engagement with wood or similar material, said fastener including a penetrating shaft and a tool-engaging head; wherein said tool engaging head is substantially frusto-conical in overall shape and provided with one or more indent regions into which said material may be pushed as the head is turned; wherein each of said indent regions include: a trench extending substantially vertically through the entirety of said head; and a tailing section extending through the entire height of the head and extending forward in the direction of turning from said trench such that the radius of the head in the corresponding section increases throughout said section. That is, where the screw is to be turned clockwise for fastening, the tailing section would extend from the trench in a clockwise (forward) direction around the circumference of the head, and where the screw is to be turned anti-clockwise for fastening, the tailing section would extend from the trench in an anti-clockwise (forward) direction around the circumference of the head.

Some features distinguish the invention from the prior art. Firstly, the indentation design, featuring the tailing section, provides a larger volume into which the displaced material can be received. In addition, the fact that the trench extends for substantially the whole height of the head and is open at the top allows displaced material to be channelled upward and out of the head where it can be cleared away. This helps to reduce mushrooming by avoiding the necessity that the displaced material is forced downward and outward into the surrounding material, by providing an 'exit' for this material.

Now will be described, by way of specific, non-limiting examples, preferred embodiments of the invention.

DETAILED DESCRIPTION OF PREFERRED EMBODIMENTS

The present invention relates to an improved ability for a self-countersinking fastener head to effectively carve a niche for itself in wood or similar composite material as it is screwed into position, without causing the surrounding material to 'mushroom' and without requiring prohibitive levels of torque to achieve the desired countersunk position.

Accordingly, the emphasis of the invention is on the design of the head itself. It will be understood by those skilled in the art that the head design disclosed herein, and illustrated in the following examples, is applicable to a variety of shafts, including various types of threaded screws, bolts and the like.

Example 1

Figure 1:
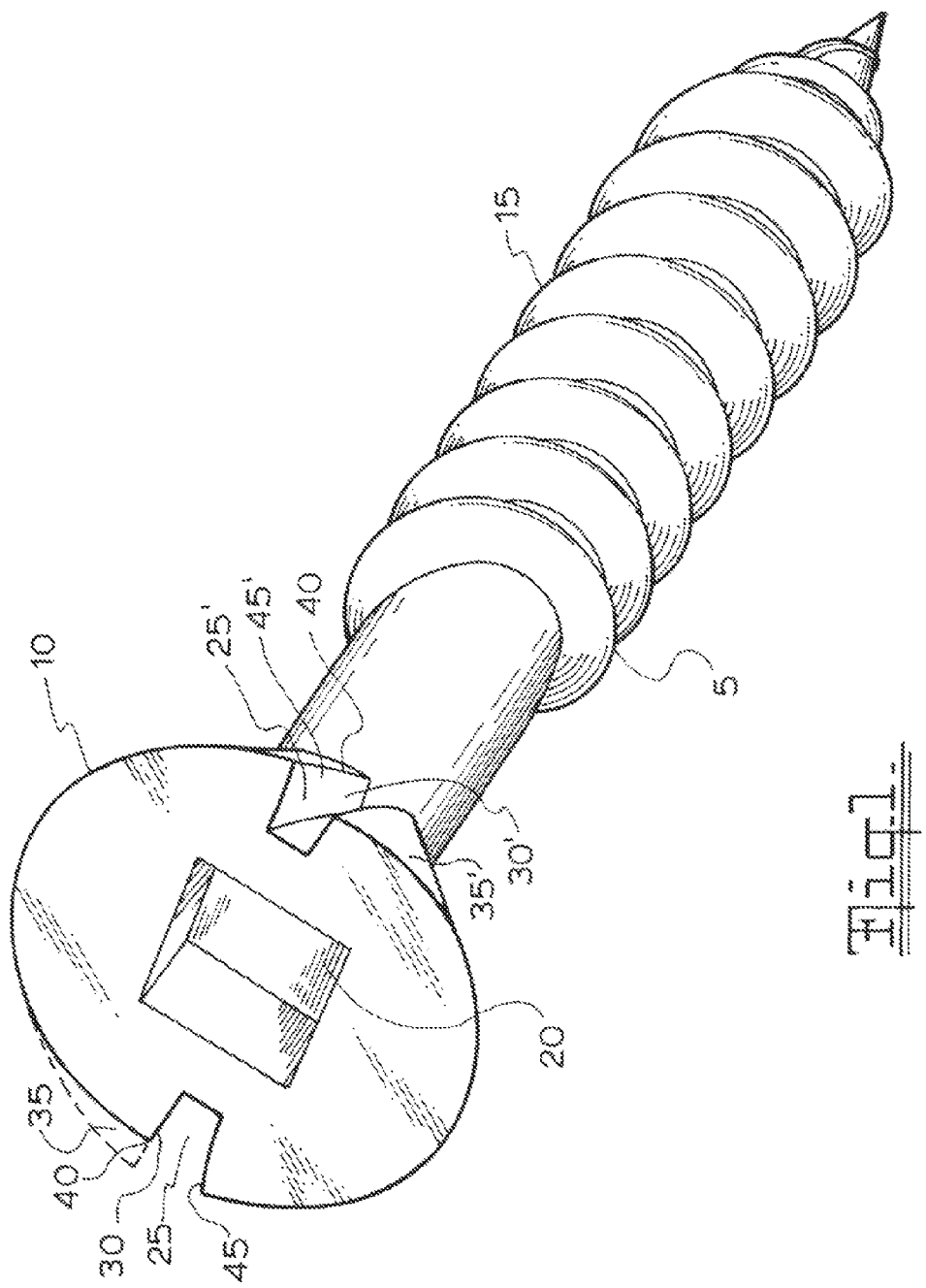
FIG. 1 is a perspective view of one embodiment of a self-countersinking fastener according to the invention.

Turning to FIG. 1, there is depicted a self-countersinking screw 5, consisting of a tool-engaging head 10 and a threaded shaft 15.

The head 10 is frusto-conical in overall shape and features, at its top, a recess 20 adapted to engage with a screw-driver. The screw may be adapted to engage with any type of screw-driver; as depicted it is adapted to engage with a square-head screwdriver.

On opposite sides of the head 10 there are provided two indent regions (25, 25') with respect to the overall frusto-conical shape. Each indent region (25, 25') consists of two distinct sections: a trench having a profile of a truncated 'V' (30, 30') and a tailing section (35, 35') that varies in depth from a maximum point (40, 40') to zero along its circumference. This geometry effectively creates two 'cutting' edges (45, 45').

As the screw is turned in a clockwise direction and as the lower part of the head 10 engages with the material, the cutting edge 45 begins to carve a frusto-conical niche in the material. The displaced material is pushed into the indent region 25. The trench 30 tends to be filled first and excess material eventually is forced into the tailing section 35.

As the head 10 sinks into the material surface, further material is forced into the indent region 25. As the head 10 is effectively open at its top, excess material can be pushed upward and out of the end of the trench 30, which can then be removed.

Example 2

Figure 2:
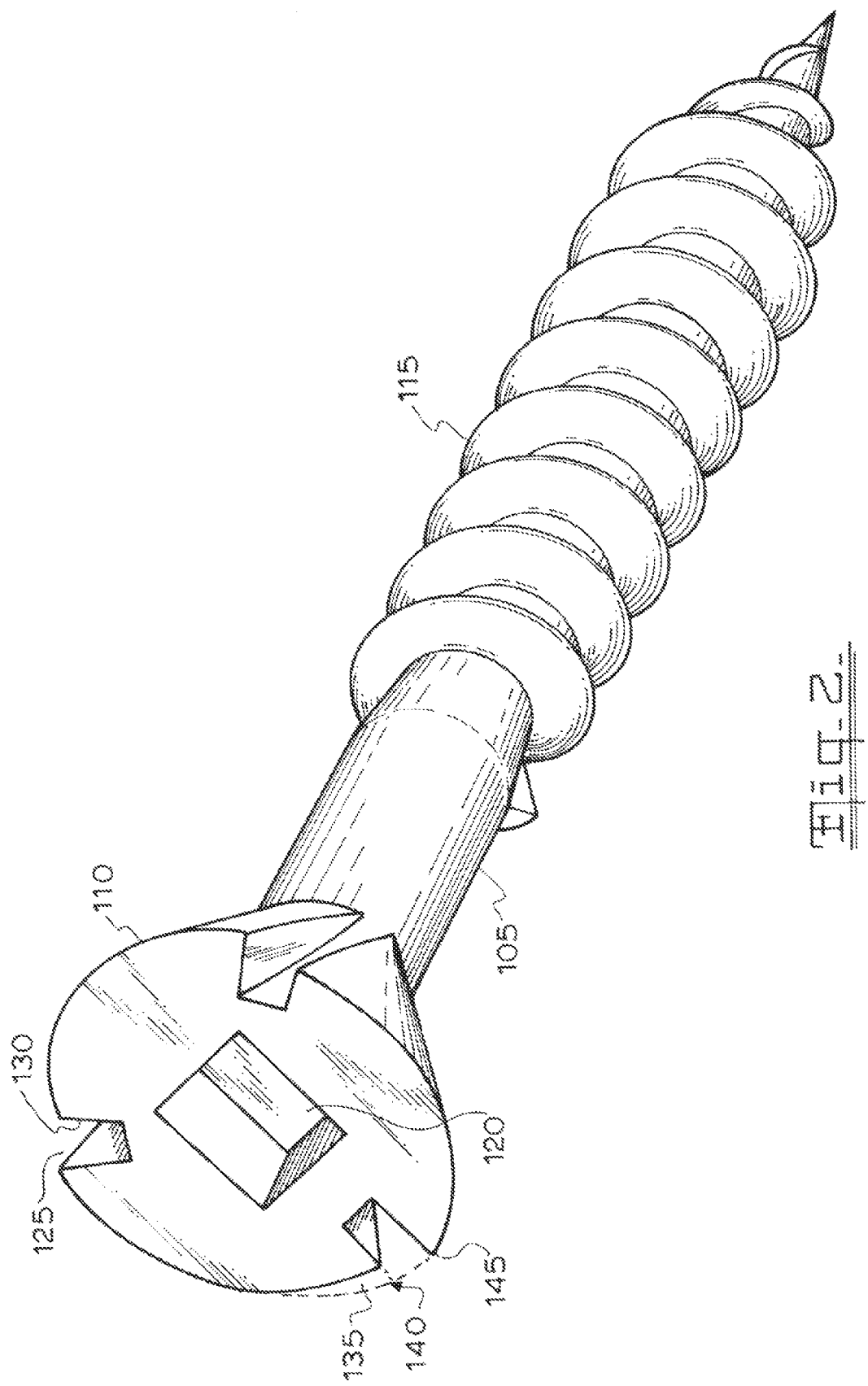
FIG. 2 is a perspective view of a self-countersinking fastener according to another aspect of the invention.

Turning to FIG. 2, there is shown a self-countersinking screw 105, consisting of a tool-engaging head 110 and a threaded shaft 115.

The head 110 is frusto-conical in overall shape and features, at its top, a recess 120 adapted to engage with a screwdriver. The screw may be adapted to engage with any type of screwdriver, as depicted it is adapted to engage with a square-head screwdriver.

Evenly spaced around the head 110 there are provided three indent regions 125. Each indent region 125 consists of two distinct sections: a trench having a profile of a truncated 'V' 130 and a tailing section 135 that varies in depth from a maximum point 140 to zero along its circumference. This geometry effectively creates three 'cutting' edges 145.

Example 3

Figure 3:
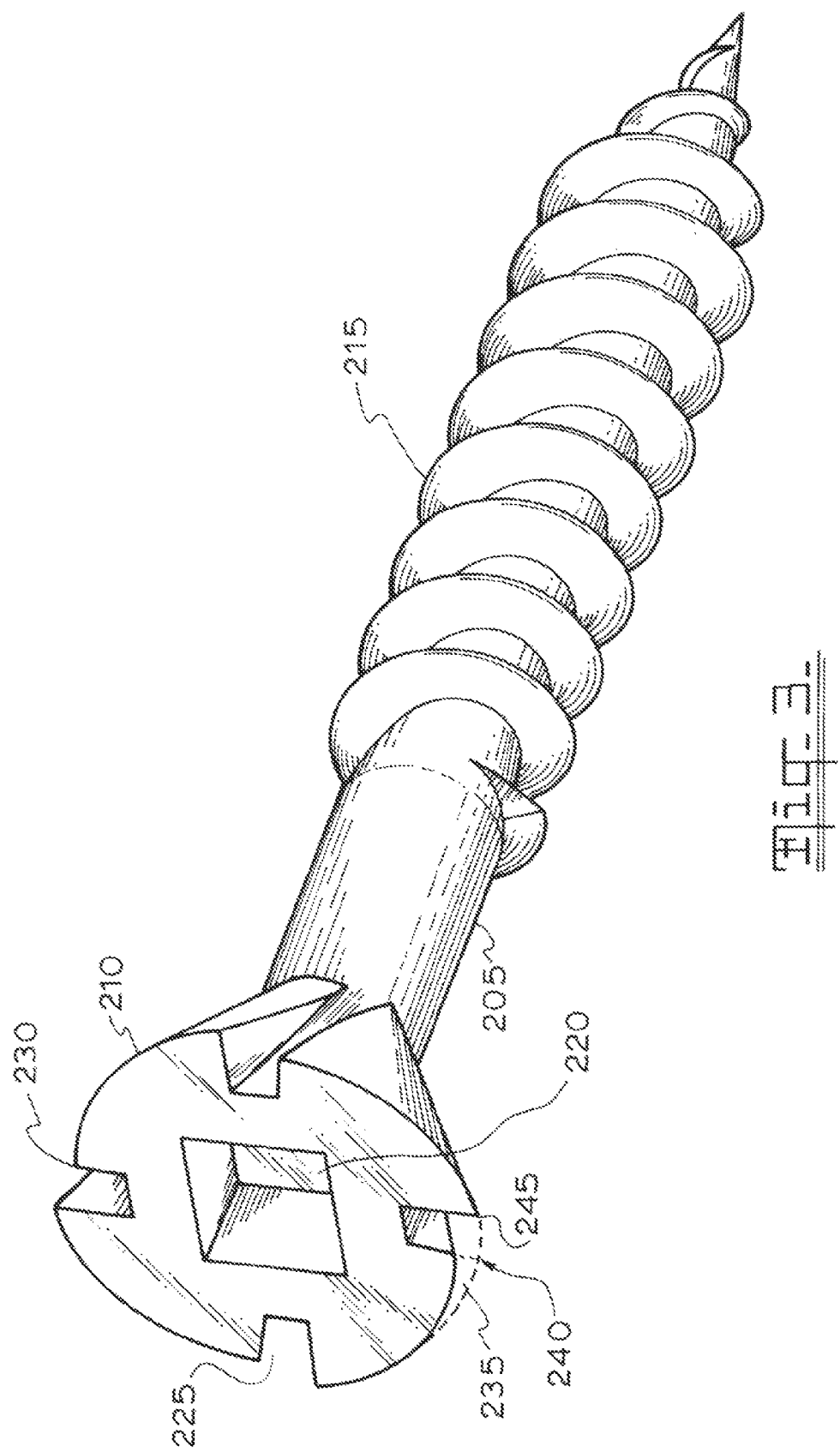
FIG. 3 is a perspective view of a self-countersinking fastener according to another aspect of the invention.

Turning to FIG. 3, there is shown a self-countersinking screw 205, consisting of a tool-engaging head 210 and a threaded shaft 215.

The head 210 is frusto-conical in overall shape and features, at its top, a recess 220 adapted to engage with a screwdriver. The screw may be adapted to engage with any type of screwdriver, as depicted it is adapted to engage with a square-head screwdriver.

Evenly spaced around the head 210 there are provided four indent regions 225. Each indent region consists of two distinct sections: a trench having a profile of a truncated 'V' and a tailing section that varies in depth from a maximum point to zero along its circumference, as per example 1. This geometry effectively creates four 'cutting' edges 245.

It will be understood by those of skill in the art that the above examples represent a limited sample of the physical embodiments by which the invention may be put into effect. Other embodiments are conceivable which, while differing in some aspects, will nevertheless fall within the scope of the claims appended hereto. These embodiments may include those where a different number of indent regions are provided as compared with those illustrated herein. These embodiments may also include those adapted to engage with other types of tools, such as flat head, or Phillips head, screwdrivers, or Allen keys, for example.

The claims defining the invention are as follows:

1. A self-countersinking fastener for engagement with wood or similar composite material, said fastener including a penetrating shaft and a tool engaging head; wherein said tool engaging head is substantially frusto-conical in overall shape and provided with one or more indent regions into which said material may be pushed as the head is turned; wherein each of said indent regions include:
    a trench extending substantially vertically through the entirety of said head; and
    a tailing section extending through the entire height of the head and extending forward in the direction of turning from said trench to the next said trench, or through at least 90°, such that the radius of the head in the corresponding section increases throughout said section.

2. The fastener of claim 1, wherein there are two said trenches and corresponding tailing sections, arranged opposite one another in respect of said head.

3. The fastener of claim 1, wherein there are three said trenches and corresponding tailing sections, arranged at substantially even intervals about said head.

4. The fastener of claim 1, wherein there are four said trenches and corresponding tailing sections, arranged at substantially even intervals about said head.

5. The fastener of claim 1, wherein said trench has a profile of a truncated 'V' that extends toward the centre of the fastener from the periphery of the tool-engaging head and from the periphery of said tailing section.

6. A self-countersinking fastener for engagement with wood or similar composite material, said fastener including a penetrating shaft and a tool engaging head; wherein said tool engaging head is substantially frusto-conical in overall shape and provided with one or more indent regions into which said material may be pushed as the head is turned; wherein each of said indent regions include:
    a trench extending substantially vertically through the entirety of said head; and
    a tailing section extending through the entire height of the head and extending forward in the direction of turning from said through at least 90°, such that the radius of the head in the corresponding section increases throughout said section.

7. The fastener of claim 6, wherein there are two said trenches and corresponding tailing sections, arranged opposite one another in respect of said head.

8. The fastener of claim 6, wherein there are three said trenches and corresponding tailing sections, arranged at substantially even intervals about said head.

9. The fastener of claim 6, wherein there are four said trenches and corresponding tailing sections, arranged at substantially even intervals about said head.

10. The fastener of claim 6, wherein said trench has a profile of a truncated 'V' that extends toward the centre of the fastener from the periphery of the tool-engaging head and from the periphery of said tailing section.

11. A self-countersinking fastener for engagement with wood or similar composite material, said fastener including a penetrating shaft and a tool engaging head; wherein said tool engaging head is substantially frusto-conical in overall shape and provided with one or more indent regions into which said material may be pushed as the head is turned; wherein each of said indent regions include:
    a trench extending substantially vertically through the entirety of said head; and
    a tailing section extending through the entire height of the head and extending forward in the direction of turning from said to the next said trench such that the radius of the head in the corresponding section increases throughout said section.

12. The fastener of claim 11, wherein there are two said trenches and corresponding tailing sections, arranged opposite one another in respect of said head.

13. The fastener of claim 11, wherein there are three said trenches and corresponding tailing sections, arranged at substantially even intervals about said head.

14. The fastener of claim 11, wherein there are four said trenches and corresponding tailing sections, arranged at substantially even intervals about said head.

15. The fastener of claim 11, wherein said trench has a profile of a truncated 'V' that extends toward the centre of the fastener from the periphery of the tool-engaging head and from the periphery of said tailing section.

* * * * *